(12) United States Patent
Hogan

(10) Patent No.: US 6,449,991 B1
(45) Date of Patent: Sep. 17, 2002

(54) ONE PART THEFT DETERRENT DEVICE

(75) Inventor: Dennis L. Hogan, Lighthouse Point, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/548,216

(22) Filed: Apr. 12, 2000

(51) Int. Cl.[7] .................. E05B 65/00; G08B 13/24
(52) U.S. Cl. .................. 70/57.1; 70/58; 70/276; 24/600.7; 340/551; 340/572
(58) Field of Search .................. 70/57.1, 276, 58; 24/600.7, 600.8, 303; 340/551, 572

(56) References Cited

U.S. PATENT DOCUMENTS

| | | | |
|---|---|---|---|
| 238,957 A | * | 3/1881 | Norton et al. ............ 24/600.8 |
| 327,008 A | * | 9/1885 | Miller ..................... 24/600.8 |
| 741,014 A | * | 10/1903 | Covert .................... 24/600.8 |
| 759,805 A | * | 5/1904 | Broga ..................... 24/600.7 |
| 761,859 A | * | 6/1904 | Sweet ..................... 24/600.8 |
| 1,062,653 A | * | 5/1913 | Koons ..................... 24/600.8 |
| 1,398,887 A | * | 11/1921 | Bond ...................... 24/600.8 |
| 3,858,280 A | | 1/1975 | Martens |
| 3,911,534 A | | 10/1975 | Martens et al. |
| 3,942,829 A | | 3/1976 | Humble et al. |
| 3,947,930 A | | 4/1976 | Martens et al. |
| 3,971,269 A | | 7/1976 | Martens |
| 3,974,581 A | | 8/1976 | Martens et al. |
| 3,995,900 A | | 12/1976 | Humble et al. |
| 4,012,813 A | | 3/1977 | Martens et al. |
| 4,187,509 A | | 2/1980 | Weiner |
| 4,221,025 A | | 9/1980 | Martens et al. |
| 4,299,870 A | | 11/1981 | Humble |
| 4,523,356 A | | 6/1985 | Charlot, Jr. |
| 4,531,264 A | | 7/1985 | Minasy |
| 4,649,397 A | | 3/1987 | Heaton et al. |
| 4,751,500 A | | 6/1988 | Minasy et al. |
| 4,774,503 A | | 9/1988 | Bussard |
| 4,774,504 A | | 9/1988 | Hartings |
| 4,944,075 A | | 7/1990 | Hogan |
| 4,987,754 A | | 1/1991 | Minasy et al. |
| 5,022,244 A | | 6/1991 | Charlot, Jr. |
| 5,031,287 A | | 7/1991 | Charlot, Jr. et al. |
| 5,068,641 A | | 11/1991 | Esch |
| 5,069,047 A | | 12/1991 | Lynch et al. |
| 5,337,459 A | | 8/1994 | Hogan |
| 5,347,262 A | | 9/1994 | Thurmond et al. |
| 5,426,419 A | | 6/1995 | Nguyen et al. |
| 5,428,875 A | | 7/1995 | Nguyen et al. |
| 5,528,914 A | | 6/1996 | Nguyen et al. |
| RE35,361 E | | 10/1996 | Hogan et al. |
| 5,685,179 A | * | 11/1997 | Yang ....................... 70/28 |

* cited by examiner

Primary Examiner—Teri Pham Luu
(74) Attorney, Agent, or Firm—Akerman, Senterfitt & Eidson, P. A.

(57) ABSTRACT

A theft deterrent device has a body portion and an attachment portion. The attachment portion has an upper jaw and a lower jaw. The upper jaw is spaced from the lower jaw so as to define a mouth in which a portion of an article can be inserted. A pin is movably mounted in the upper jaw, at least between a retracted position in which the pin does not substantially extend into the mouth, and an extended position in which the pin extends through the mouth and into the lower jaw. Releasable locking structure is provided to secure the pin in the extended position. The device can be used in combination with electronic article surveillance technology to secure articles against theft, with reduced damage to the articles and with reduced risk to persons handling the tags. A detachment device for use with a theft deterrent device is also disclosed.

10 Claims, 10 Drawing Sheets

ONE PART THEFT DETERRENT DEVICE

CROSS-REFERENCE TO RELATED APPLICATIONS (Not Applicable)

BACKGROUND OF THE INVENTION

1. Field of the Invention

This invention relates to theft deterrent devices, and more particularly to hard tags particularly used in electronic article surveillance systems.

2. Description of the Relevant Art

Theft deterrent hard tags are used to protect many articles, including clothing and other soft goods. Usually, the tags include electronic article surveillance structure. This structure signals a receiver electronically when the tag comes within range of the receiver. The receiver is typically located at or near a store exit and signals an alarm if the tag comes within a specified range, typically, 3 feet to 9 feet. The distance depends in part upon the particular electronic article surveillance technology that is used. The tag is normally removed by the cashier at the point of sale, so that the customer can pass near to the receiver with goods which have been purchased, without signaling the receiver.

EAS tags typically utilize a nail-like pin which has a large head. The pin is passed through the cloth or other soft portion of the article, and is engaged to a pin retainer mechanism within the tag. When the pin is fully seated in the retainer, the large pin head holds the cloth to the body of the tag and prevents removal of the tag/pin assembly from the article. The retainer is quite strong and will release the pin only by the cashier or other authorized person using a special tool.

Several different pin and retainer assemblies are known in the art. One such retainer is a clamp which engages locking grooves in the pin when the pin is inserted into the retainer. A mechanical or magnetic tool is used to move the clamp out of engagement with the pin, such that the pin can be removed from the retainer and the tag removed from the article. Other retainer mechanisms include ball clutches and wedge clutches.

Two-part pin and tag mechanisms are not easily or safely handled. The pin presents a hazard when it is removed from the tag. This hazard can be especially acute in a self check-out system in which customers are expected to remove the tags themselves, after paying for the goods using various proposed electronic self check-out systems. It is, therefore, desirable to provide a theft deterrent hard tag which will not present the hazards encountered by current two-part pin and tag mechanisms.

Current pins are approximately 0.047 inches in diameter with circular locking grooves. This structure is detrimental when tagging finely woven cloth because the large pin size creates a large hole in the cloth, and can snag the cloth on the grooves which are provided on the pin to engage the retainer. Magnetically releasable clutches are desirable retainers because they do not damage the pin and are relatively simple to use. Magnetically releasable clutches can sometimes be compromised, however, by using a strong magnet or by striking on a hard surface. These techniques can be used to release the magnetically releasable clutch from locking engagement with the grooves on the pin shaft. There is accordingly a need for a magnetic clutch that is more difficult to defeat than prior magnetic clutch devices.

BRIEF SUMMARY OF THE INVENTION

The invention provides a theft deterrent device with a tag having a body portion and an attachment portion. The attachment portion has an upper jaw and a lower jaw. The upper jaw is spaced from the lower jaw so as to define a mouth into which a portion of an article can be inserted. A pin is movably mounted in the upper jaw, at least between a retracted position in which the pin does not substantially extend into the mouth, and an extended position in which the pin extends through the mouth and into the lower jaw. Releasable locking structure is provided to secure the pin in the extended position.

The releasable locking structure can be provided in the upper jaw, in the lower jaw, or both. The provision of more than one locking structure makes the theft deterrent device more difficult to compromise. The releasable locking structure can comprise any suitable structure, such as clamp and clutch mechanisms. Magnetically releasable structure is preferred. If the locking structure is a magnetically releasable locking structure, then more than one locking structure is preferred because magnetic locking structures can be compromised by striking the device against a hard surface, or by placing a single strong magnet adjacent to the locking structure. The magnetically releasable locking structure preferably comprises at least one spring catch. The spring catch has a first position in which the spring catch locks the pin in the extended position. The spring catch is movable by the positioning of at least one magnet substantially adjacent to the spring catch to a second position in which the spring catch permits the pin to return to the retracted position. The releasable locking structure preferably includes at least two spring catches, such that at least two magnets, one positioned substantially adjacent to each spring catch, are necessary to permit the pin to return to the retracted position. The pin preferably has a point at one end, and an opposite end that is secured to a head. The head is movably mounted in a chamber in the upper jaw, but is not completely removable from the chamber. Pushing on the head moves the head in the chamber and thereby moves the pin to the extended position.

Biasing structure is preferably provided for returning the head and the pin to the retracted position. The biasing structure preferably comprises at least one compression spring provided in the chamber and acting between the head and a base of the chamber. At least two spring catches are preferably provided in the chamber. The head can have locking tabs for engaging the spring catches, whereby the spring catches must be acted upon by magnets to move the spring catches out of locking engagement with the locking tabs.

A foot can be movably mounted in an aperture in the base of the chamber. The foot has a channel for receiving the pin. Structure operatively connects the foot to the head, such that movement of the head moves the foot through the aperture and into the mouth so as to engage the article while the pin pierces the article. The structure for operatively connecting the foot to the head preferably comprises at least one compression spring mounted between the foot and the head. When the head is moved to the extended position, the compression spring will bias the foot into engagement with the article. The foot, when extended into the mouth, will engage the article around the pin, pressing the article against the upper surface of the lower jaw, thus helping to prevent tearing of the article by movement against the pin. Biasing structure is preferably also provided for biasing the foot into the chamber. The biasing structure will return the foot into the chamber when the head returns to the retracted position.

The body portion of the tag preferably includes structure for signaling an electronic article surveillance receiver, and/or a radio frequency identification (RFID) device.

DETAILED DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

A theft deterrent tag device 10 according to the invention is shown in FIGS. 1–6. The tag device 10 includes a body portion 14 and an attachment portion 18.

Figure 1A:
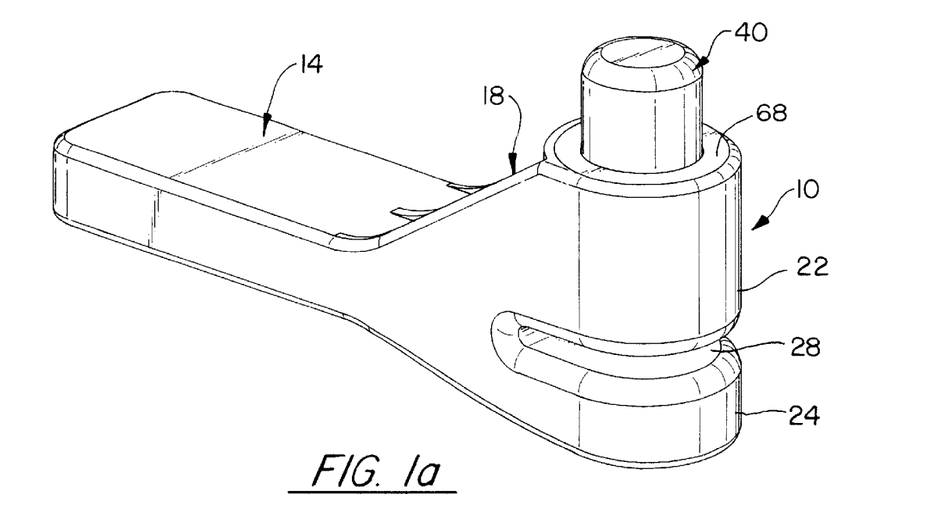
FIG. 1a is a perspective view of a one part theft deterrent hard tag according to the invention in a first, retracted position.
Figure 1B:
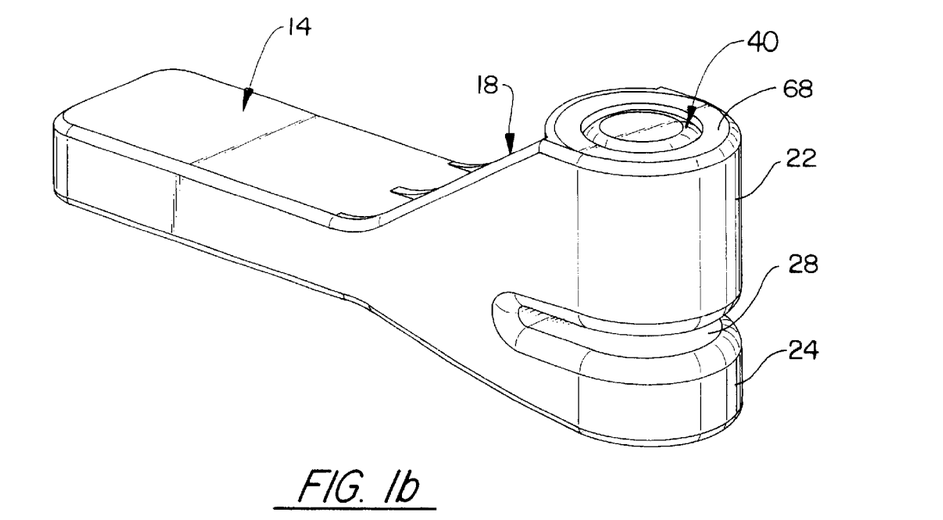
FIG. 1b is a perspective view in a second, extended position.
Figure 2:
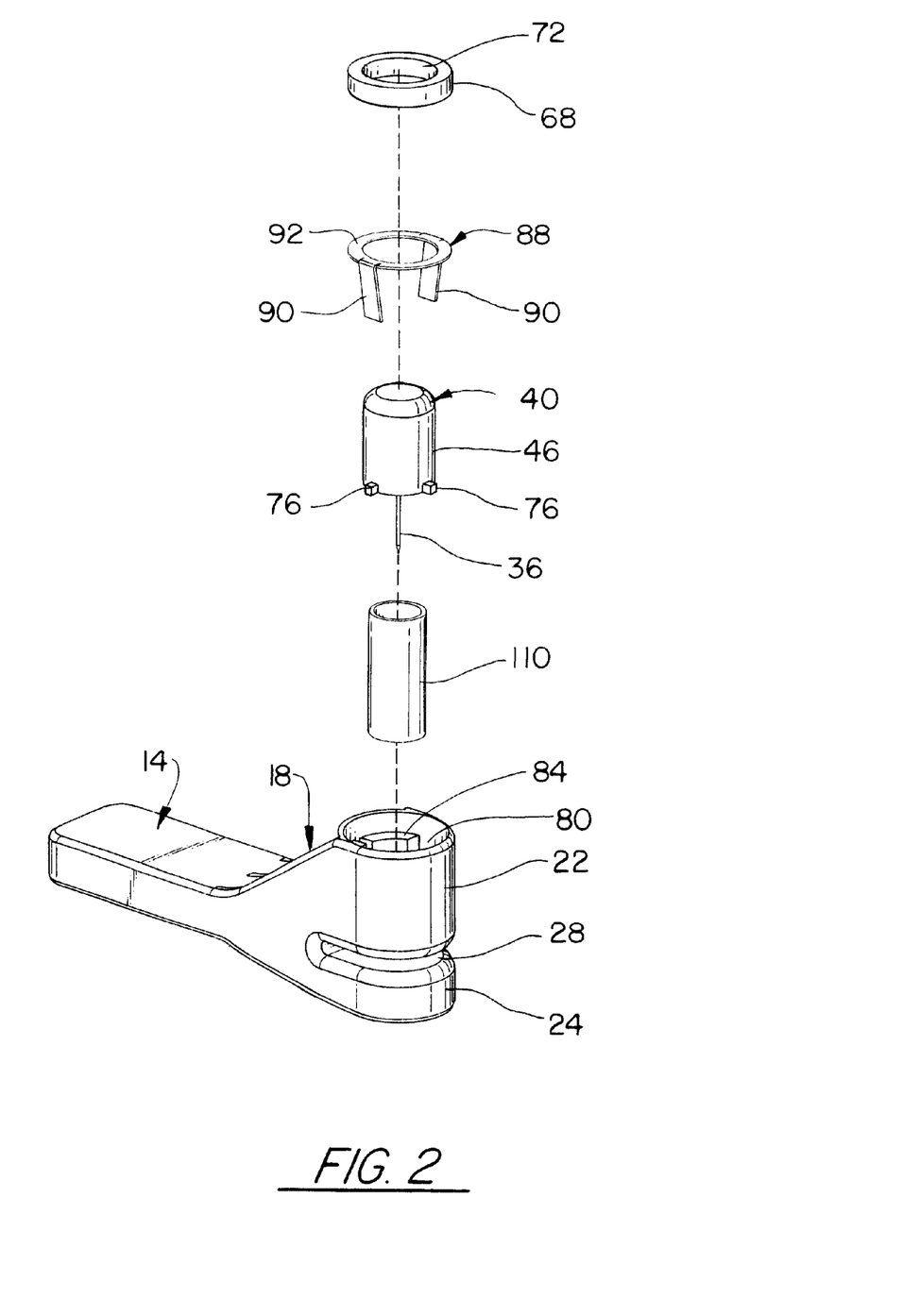
FIG. 2 is an exploded perspective view.

The attachment portion 18 includes an upper jaw 22 and a lower jaw 24. The upper jaw 22 and lower jaw 24 are spaced apart and define a mouth 28, into which a portion of an article can be inserted. A pin 36 is movably mounted in the upper jaw 22, at least between a retracted position in which the pin 36 does not substantially extend into the mouth 28, and an extended position in which the pin 36 extends through the mouth 28 and into the lower jaw 24. Releasable locking structure is provided to secure the pin 36 in the extended position. The releasable locking structure can be provided in the upper jaw 22, in the lower jaw 24, or both. The provision of more than one locking structure makes the theft deterrent device 10 more difficult to compromise. The releasable locking structure can comprise any suitable structure, such as clamp and clutch mechanisms. Magnetically releasable structure is preferred. If the locking structure is a magnetically releasable locking structure, then more than one locking structure is preferred because magnetic locking structures can be compromised by striking the device against a hard surface, or by placing a single strong magnet adjacent to the locking structure.

The upper jaw 22 preferably can define an open interior chamber 32. The pin 36 is movable within the chamber 32. The pin 36 is mounted concentrically to a head 40. A pin head end 42 of the pin 36 can be fixed in the head 40 by any suitable means, including insert molding, adhesives, welds and the like.

Figure 3:
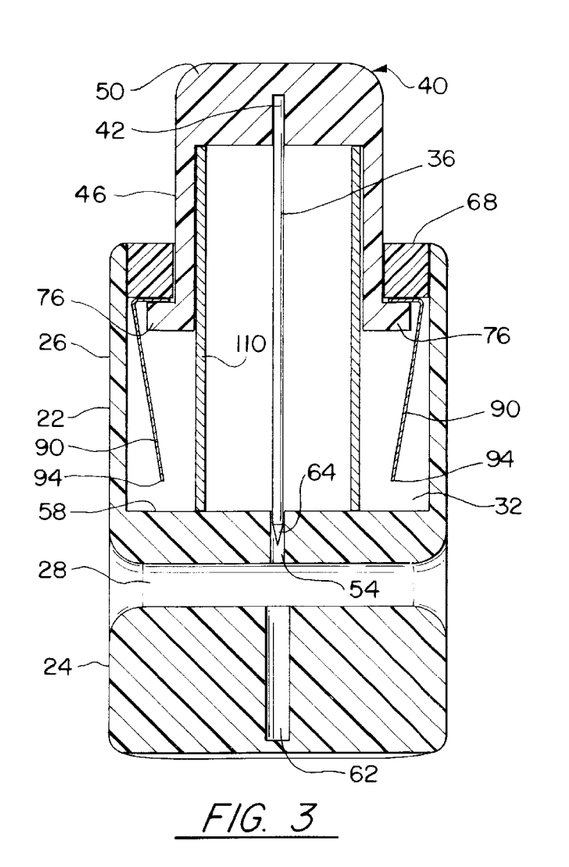
FIG. 3 is a cross section illustrating the head and pin assembly in the retracted position.
Figure 4:
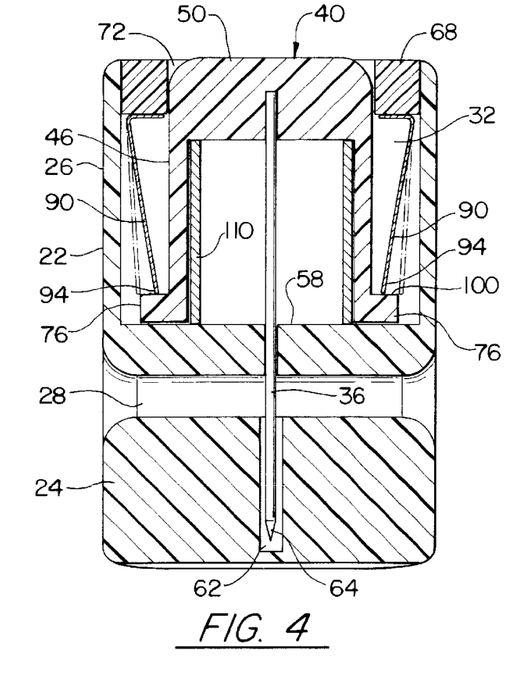
FIG. 4 is a cross section, partially in phantom, illustrating the head and pin assembly in the extended position.

The head 40 is preferably substantially tubular with a side wall 46 and an end wall 50. The head 40 is movably mounted in the chamber 32 of the upper jaw 22. An aperture 54 is provided in a base 58 of the upper jaw 22, to permit passage of the pin 36 out of the chamber 32, through the mouth 28, and into a receiving aperture 62 that is formed in the lower jaw 24 (FIG. 4). The head 40 is movable between a retracted position in which a point 64 of the pin 36 is retracted substantially out of the mouth 28, and an extended position in which the point 64 of the pin 36 extends through the mouth 28 and into the receiving aperture 62. The top of the chamber 32 is preferably defined by a washer-shaped end wall 68 which is secured to the side wall 26 of the chamber 32 by suitable structure such as adhesives or welds. The head 40 is capable of movement through the opening 72 as depicted in FIGS. 3–4. Tabs 76, and preferably at least two symmetrically placed tabs 76, are provided on an end of the side walls 46 of the head 40 opposite to the end wall 50. More or fewer tabs 76 could be used. The tabs 76 are movable in grooves 80 which are formed by protruding portions 84 extending inward from the side wall 26 of the chamber 32.

A spring catch 88 is preferably provided in the form of at least one magnetically attractable leaf spring 90. In the preferred embodiment two leaf springs 90 are provided on substantially opposite sides of a mounting ring 92. The spring catch 88 is mounted within the chamber 32, preferably with the mounting ring 92 secured between an interior surface of the end wall 68 and the upper surface of protruding portions 84. The leaf springs 90 are positioned substantially in the grooves 80. Movement of the head 40 from the retracted position shown in FIG. 3 to the extended position of FIG. 4, moves the tabs 76 downward against the action of the leaf springs 90. The leaf springs 90 are forced outward by the tabs 76 to the position shown by the phantom lines in FIG. 4, until the tabs 76 pass the ends 94 of the leaf springs 90. The height of the chamber 32 is selected to be slightly greater than the combined length of the leaf springs 90 and tabs 76, such that when the tabs 76 are pushed to the base 58 of the chamber 32, the ends 94 of the leaf springs 90 can spring inward over a top surface 100 of the tabs 76 (FIG. 4). In this manner, the leaf springs 90 will spring inward over the top surface 100 of the tabs 76 to lock the head 40 in the extended position shown in FIG. 4.

Figure 5:
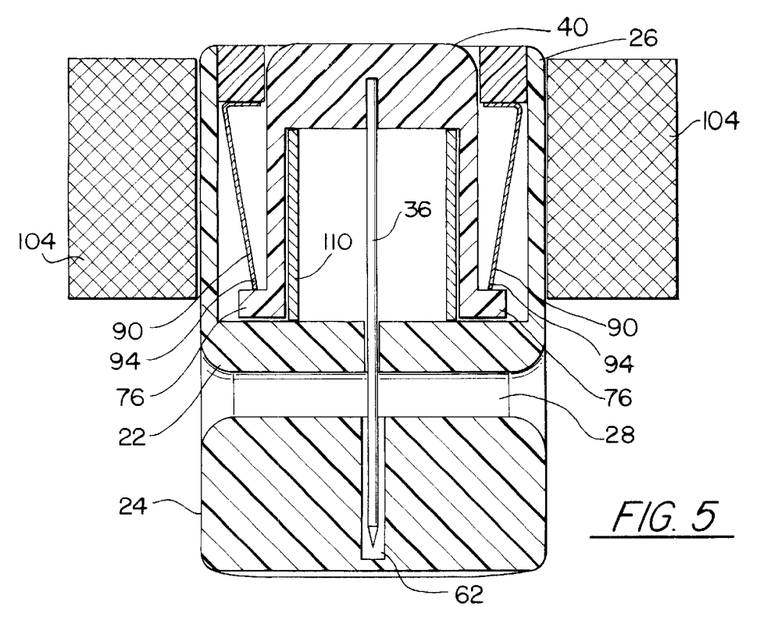
FIG. 5 is a cross-section illustrating the positioning of magnets to release the head and pin assembly.
Figure 6:
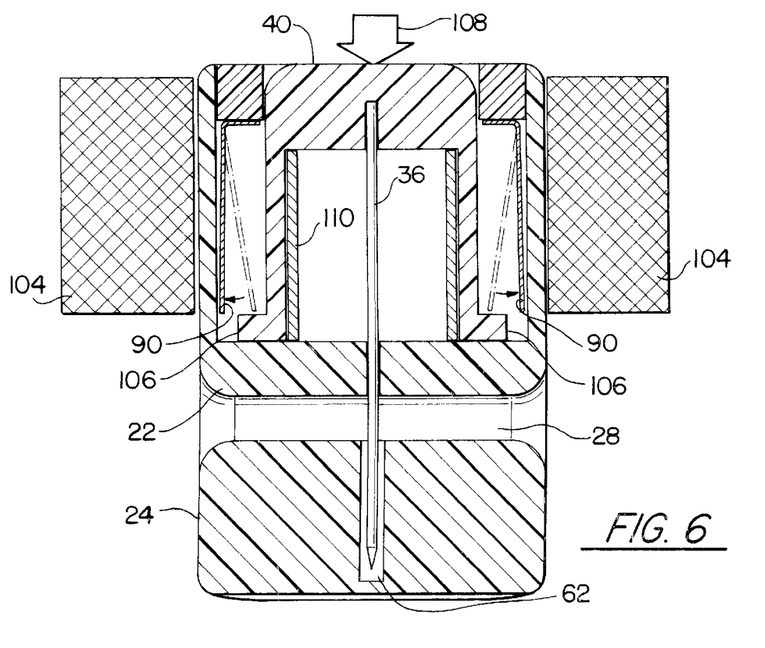
FIG. 6 is a cross section, partially in phantom, illustrating the action of the magnets to release the head and pin assembly.

The manner in which the head 40 is released from the extended position shown in FIG. 4, to return to the retracted position of FIG. 3, is shown in FIGS. 5–6. A pair of magnets 104 are positioned on each side of the upper jaw 22 substantially adjacent to the leaf springs 90. The magnets 104 are preferably provided in a single piece detachment device which holds the magnets 104 in spaced relation, substantially in the position shown, and permits the insertion of the upper jaw 22 between the magnets 104. Preferably, the detachment device positions one magnet 104 adjacent to each magnetically attractable leaf spring 90. The action of the magnets 104 is to draw the leaf springs 90 outward from the position shown in FIG. 5 to the position shown in FIG. 6. The ends 94 of the leaf springs 90 are drawn outward against their bias by the magnets 104 beyond ends 106 of the tabs 76. The head 40 may have to be depressed downward with a force indicated by the arrow 108 (FIG. 6), in order to insure that the ends 94 are removed from top surfaces 100 of the tabs 76, so that the leaf springs 90 can move freely to the position shown in FIG. 6. The head 40 is then capable of movement to the retracted position shown in FIG. 3. This movement is aided by suitable biasing structure such as the compression spring 110. The compression spring 110 acts to lift the head 40 from the extended position in FIG. 4 to the retracted position shown in FIG. 3. The compression spring 110 can be any suitable spring structure such as a standard coil compression spring, or a tubular elastic material. In the retracted position shown in FIG. 3, upper surfaces 100 of the tabs 76 contact the end wall 68 so as to prevent the head 40 from removal from the chamber 32.

Figure 7:
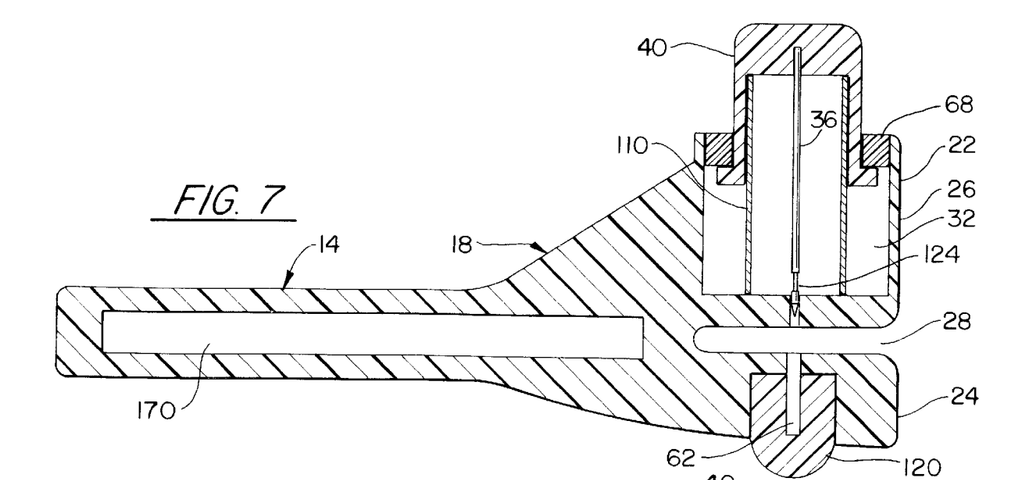
FIG. 7 is a cross section illustrating another embodiment of the theft deterrent tag, in the retracted position.
Figure 8:
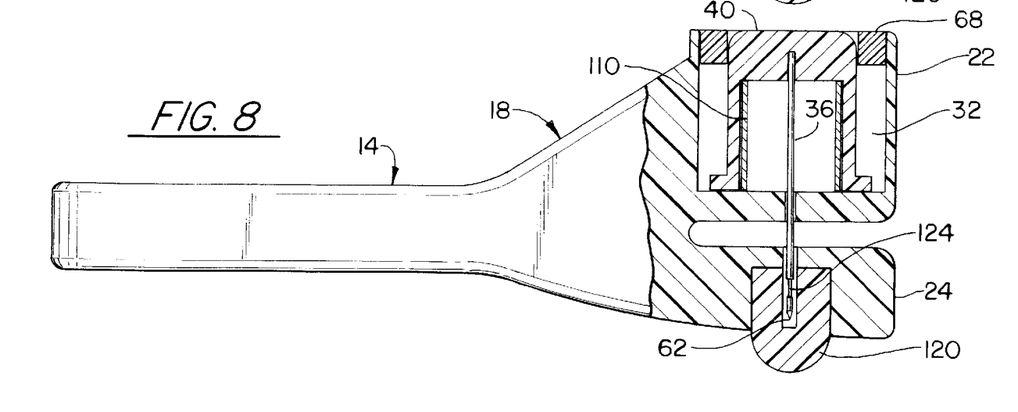
FIG. 8 is a partial cross section illustrating the theft deterrent tag in an extended position.
Figure 9:
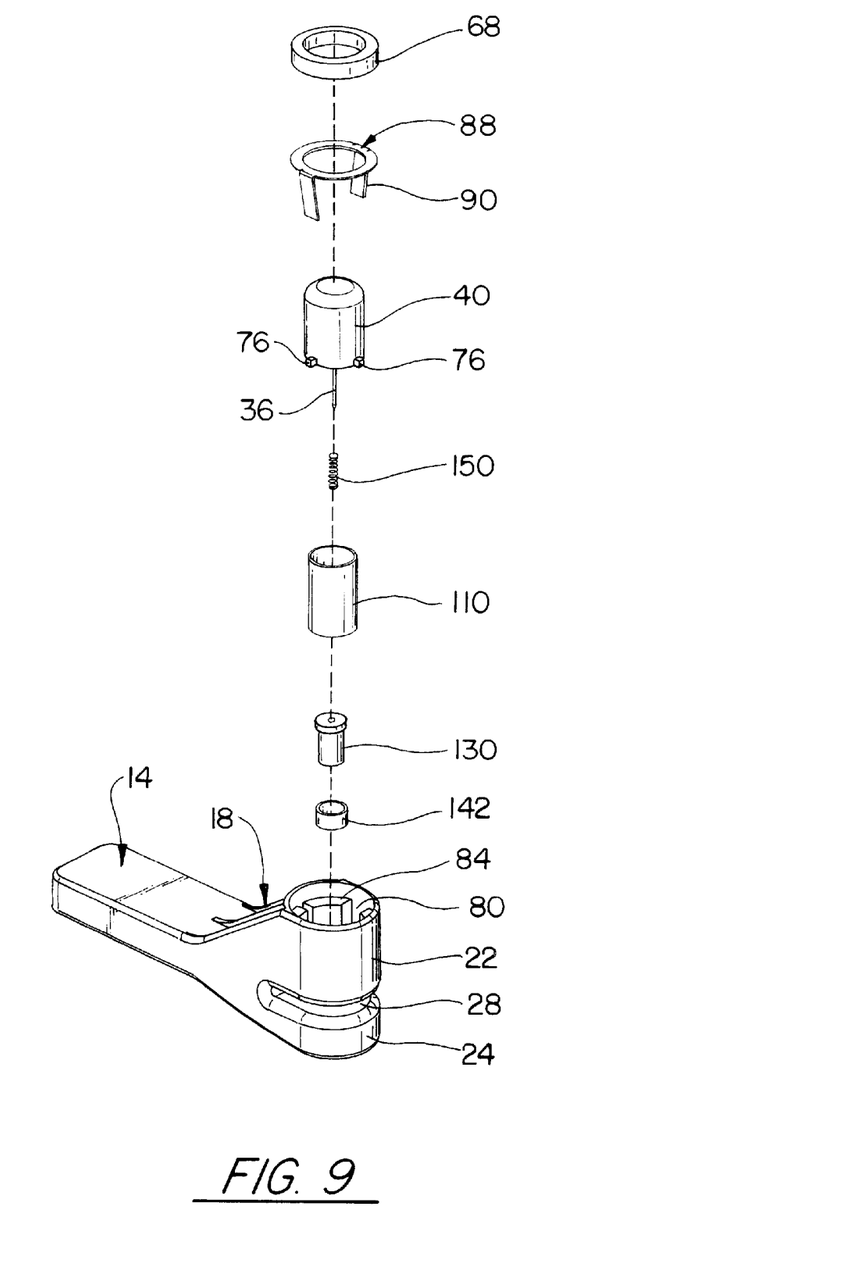
FIG. 9 is an exploded perspective of another alternative embodiment.

The embodiment shown in FIGS. 7–8 utilizes a clutch assembly 120 in the lower jaw 24. The pin 36 has structure such as the groove 124 for engaging suitable engagement structure in the clutch 120. As is known in the art, this structure can be a magnetic clutch, although other engagement structures are also possible. Movement of the head 40 to the extended position shown in FIG. 8 pushes the pin 36 and the groove 124 into the clutch assembly 120, where it is securely engaged by the engagement structure. The pin 36 is released by suitable magnetic or mechanical disengagement structure, as is known in the art. In one embodiment, a magnet is placed closely adjacent to the lower clutch 120 to release a magnetic catch from engagement with the pin 36. In another embodiment, a mechanical tool is used to alter the lower jaw 24 so as to mechanically move a spring clip or rotary clip out of the engagement with the pin 36. The compression spring 110 in the chamber 32, upon disengagement of the pin 36 from the lower clutch 120, acts to move the head 40 from the extended position shown in FIG. 8 to the retracted position shown in FIG. 7. Although the embodiment shown in FIGS. 7–8 does not include the clutch assembly including the leaf springs 90 in the chamber 32, it will be apparent to one skilled in the art that such a clutch assembly in the upper jaw could be used in tandem with the clutch assembly in the lower jaw. In such an embodiment, at least three magnets would be required in a removal device to release the pin from the extended position to return to the retracted position. This embodiment would be very resistant to tampering, as it would be very difficult to simultaneously hold three strong magnets in the appropriate position around the attachment portion 18 without the removal device.

Figures 10, 11, 12, 13:
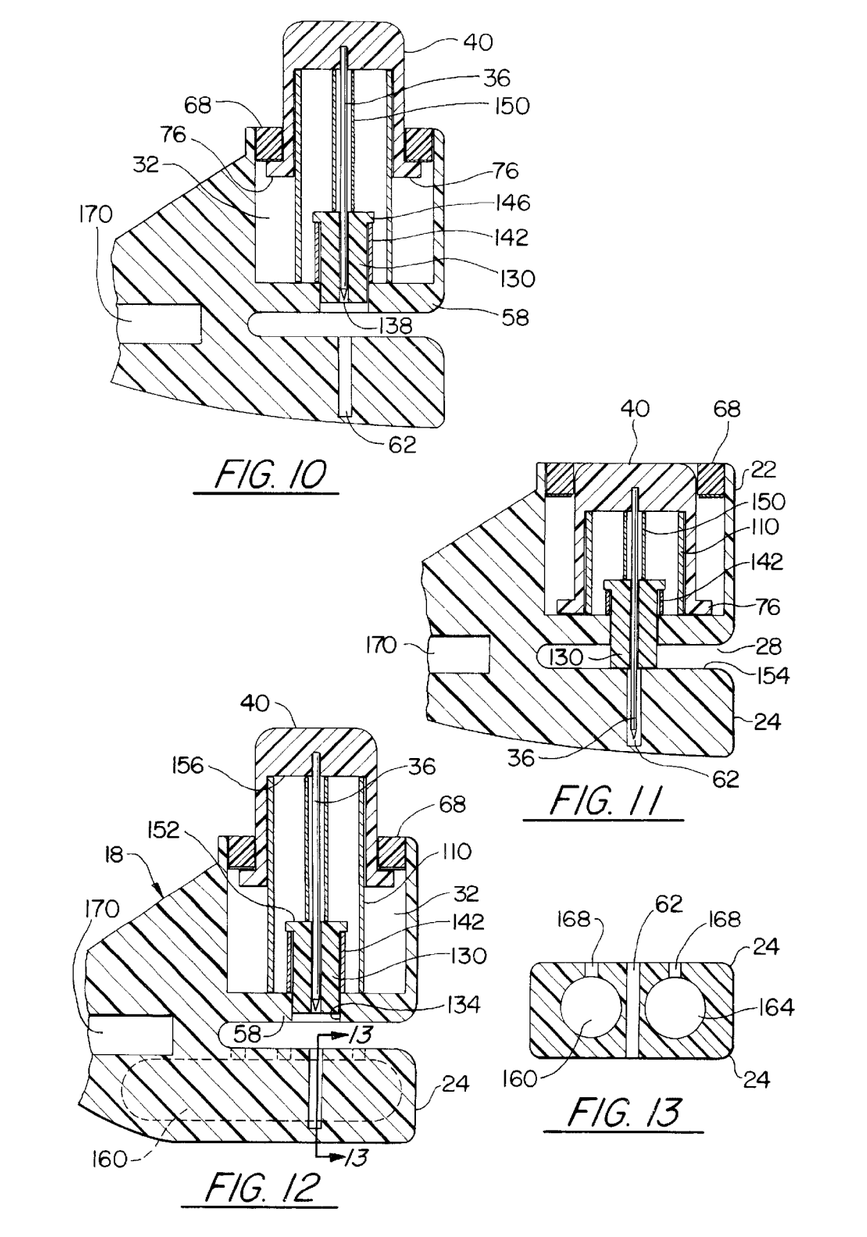
FIG. 10 is a cross section of the alternative embodiment in a retracted position.
FIG. 11 is a cross section of the alternative embodiment in an extended position.
FIG. 12 is a cross section, partially in phantom, of another embodiment.
FIG. 13 is a cross section taken along line 13—13 in FIG. 12.

There is shown in FIGS. 9–13 an embodiment which is particularly useful for soft goods such as fine fabrics, which are susceptible to damage by the pin 36. In this embodiment, a foot 130 preferably in the shape of a cylinder is slidably mounted in an opening 134 in the base 58 of the upper jaw 22. The foot 130 has a central opening 138 which is adapted to receive the pin 36. Biasing structure, such as the compression spring 142, is mounted between the base 58 and a spring seat 146 on the foot 130, so as to bias the foot 130 into the chamber 32. Suitable structure, such as the compression spring 150 mounted between a top surface 152 of the foot 130 and an inside surface 156 of the head 40, biases the foot 130 in the opposite direction, that is, out of the chamber 32. Movement of the head 40 from the retracted position shown in FIG. 10 to the extended position in FIG. 11 will cause the compression spring 150 to act on the foot 130, and to move the foot 130 into the mouth 28, as shown in FIG. 11. The pin 36 passes through the article such as clothing, and passes into the receiving aperture 62. Suitable engagement structure such as a clutch in the upper chamber 32, and/or other locking structure, as previously described, can be provided to secure the pin 36 in the extended position. The pin 36 will pierce the article that is positioned into the mouth 28 to secure the theft deterrent device to the article. The foot 130, under the influence of the compression spring 150, will gently press the article against upper surface 154 of the lower jaw 24. This engagement of the foot 130 to the article will help to prevent pulling of the article against the pin 36, which frequently results in torn or damaged goods. Upon release of the pin 36 by methods as previously described, the compression spring 142 will act to raise the foot 130 into the chamber 32, as the head 40 is moved by the compression spring 110 to the retracted position in which pin 36 is withdrawn from the mouth 28 (FIG. 12).

The theft deterrent device according to the invention can be utilized with other theft deterrent structure. In the embodiment shown in FIGS. 12–13, ink vials 160, 164 are provided in the lower jaw 24. As is known in the art, ink is contained within frangible membranes such as a thin glass container. Upon unauthorized prying of the lower jaw 24 to remove the theft deterrent device from an article, the glass membranes will break, releasing ink through opening 168, which will damage the goods and render the goods useless to the person tampering with the device. An opening 170 in the body 14 can be used to contain suitable theft deterrent structure such as electronic article surveillance (EAS) structure and/or RFID structure.

The pin 36 is tamper resistant since it is secured between the upper jaw 22 and the lower jaw 24. This mounting of the pin 36 will permit the use of a pin diameter smaller than what was necessary with two-part tag devices, particularly where more than one locking device is used in tandem to secure the pin 36. The shaft diameter of the pin is preferably less than about 0.030 inches, and most preferably about 0.025 inches. The reduced shaft diameter is the same as standard straight pins and will be less likely to damage goods than current tagging devices, with larger shaft diameters. Some locking devices which engage grooves in the pin, such as magnetic pin clutches, rotary clips or spring clips, may require a larger pin size such as the 0.047 that is currently widely used in the industry. The larger pin diameter allows for larger grooves which are more readily engaged by such locking devices.

Figure 14:
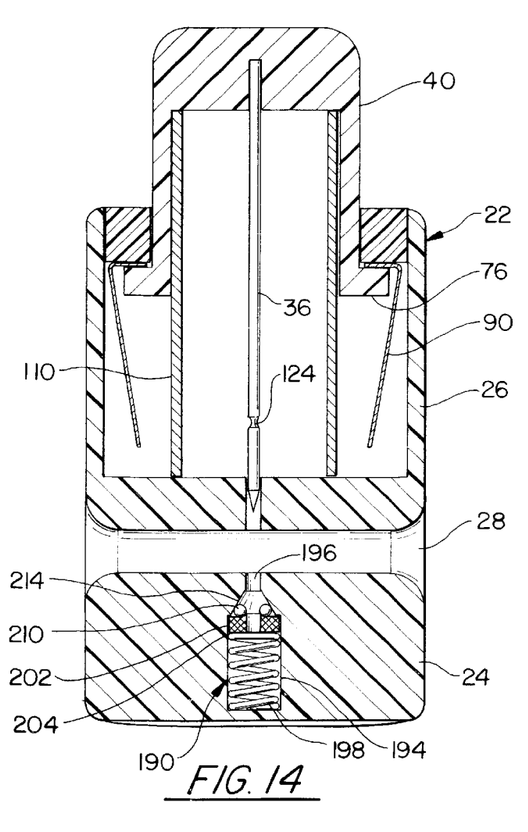
FIG. 14 is a cross section of an attachment portion of an alternative embodiment, in a retracted position.
Figure 15:
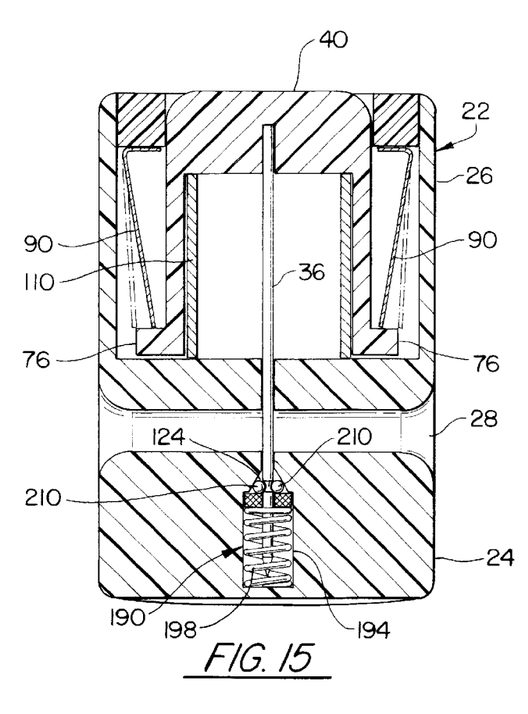
FIG. 15 is a cross section of the embodiment of FIG. 14 in an extended position.

There is shown in FIGS. 14–15 an embodiment of the invention with a magnetic ball clutch assembly 190 in the lower jaw 24. The clutch assembly 190 is provided in a recess 194. An opening 196 provides access by the pin 36 to the recess 194. A compression spring 198 is provided in the recess 194. The compression spring 198 acts on a collar 202. The collar 202 has a central opening 204. Ball bearings 210 rest on the collar 202, against an inclined surface 214 of the recess 194.

Movement of the head 40 and pin 36 from the retracted position shown in FIG. 14 to the extended position shown in FIG. 15 will cause the pin 36 to move through the opening 196, the central opening 204, and into the recess 194. The ball bearings 210 will be moved apart and down the inclined surface 214 by the pin 36 to permit the pin 36 to pass between them. The ball bearings 210 will then engage the groove 124 and will lock against the inclined surface 214 under the bias of the spring 198 to prevent the removal of the pin 36 from the recess 194. The collar 202 is magnetically attractable, such that a magnet placed under the lower jaw 24 will draw the collar 202 downward against the bias of the spring 198. The ball bearings 202 will move outward and down the inclined surface 214, to release the pin 36, which will be withdrawn from the recess 194 by the action of the spring 110 acting against the head 40.

Figure 16:
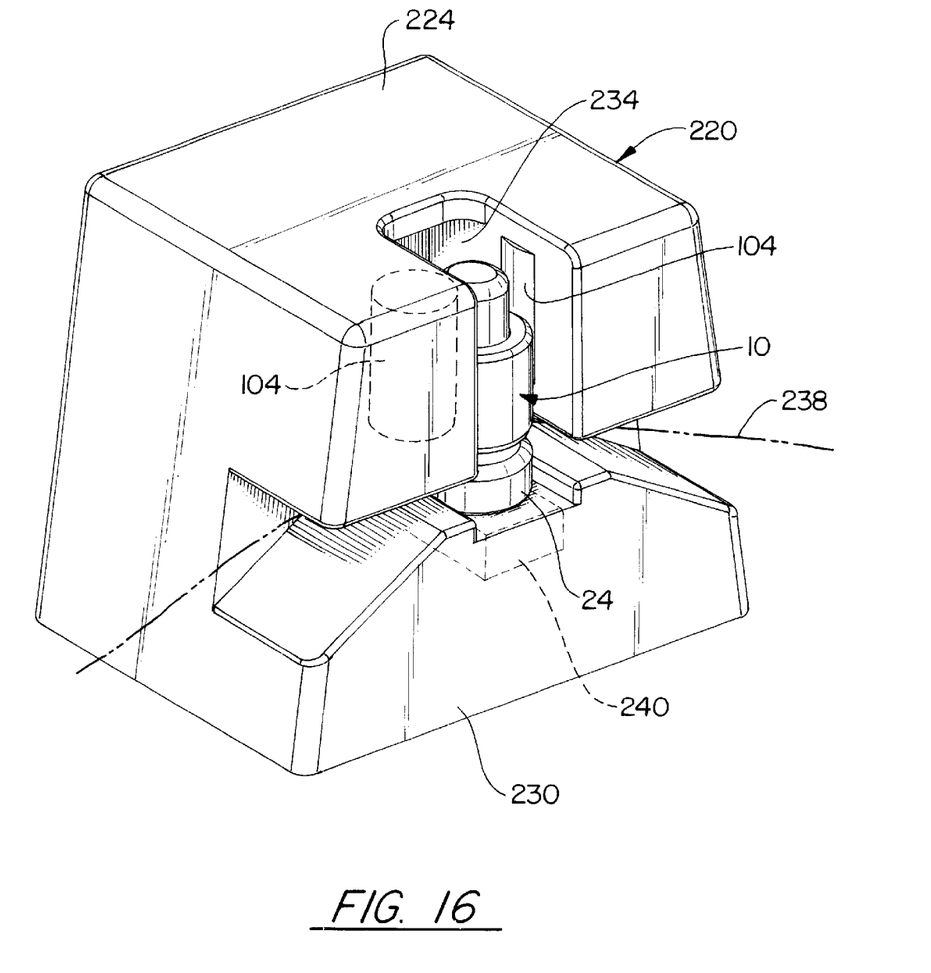
FIG. 16 is a perspective, partially in phantom, of a theft deterrent device according to the invention positioned in a detachment device.

A detachment device is required to retract the pin 36 from the recess 194 so as to permit the removal of the tag from the article. At least three strong magnets are required to detach the tag from the article, one adjacent each of the leaf springs 90, and one below the clutch assembly 190. There is shown in FIG. 16 a detachment device 220. The detachment device 220 has a resilient housing 224. The housing 224 has a cavity 234 which is dimensioned so as to receive and hold in place a tag 10 according to the invention. Side openings 236 formed in the face 230 of the housing 224 receive the article 238 (phantom lines) to permit the tag 10 to be placed into the cavity 234 without bunching or tearing of the article. Magnets 104 are positioned in the housing 224 such that, when the tag 10 is inserted into the cavity 234, the leaf springs 90 will be positioned substantially adjacent to the magnets 104. A third magnet 240 is positioned in the housing 224 such that, when the tag 10 is positioned in the cavity 234, the clutch assembly 190 will be positioned immediately above the magnet 240.

Figure 17:
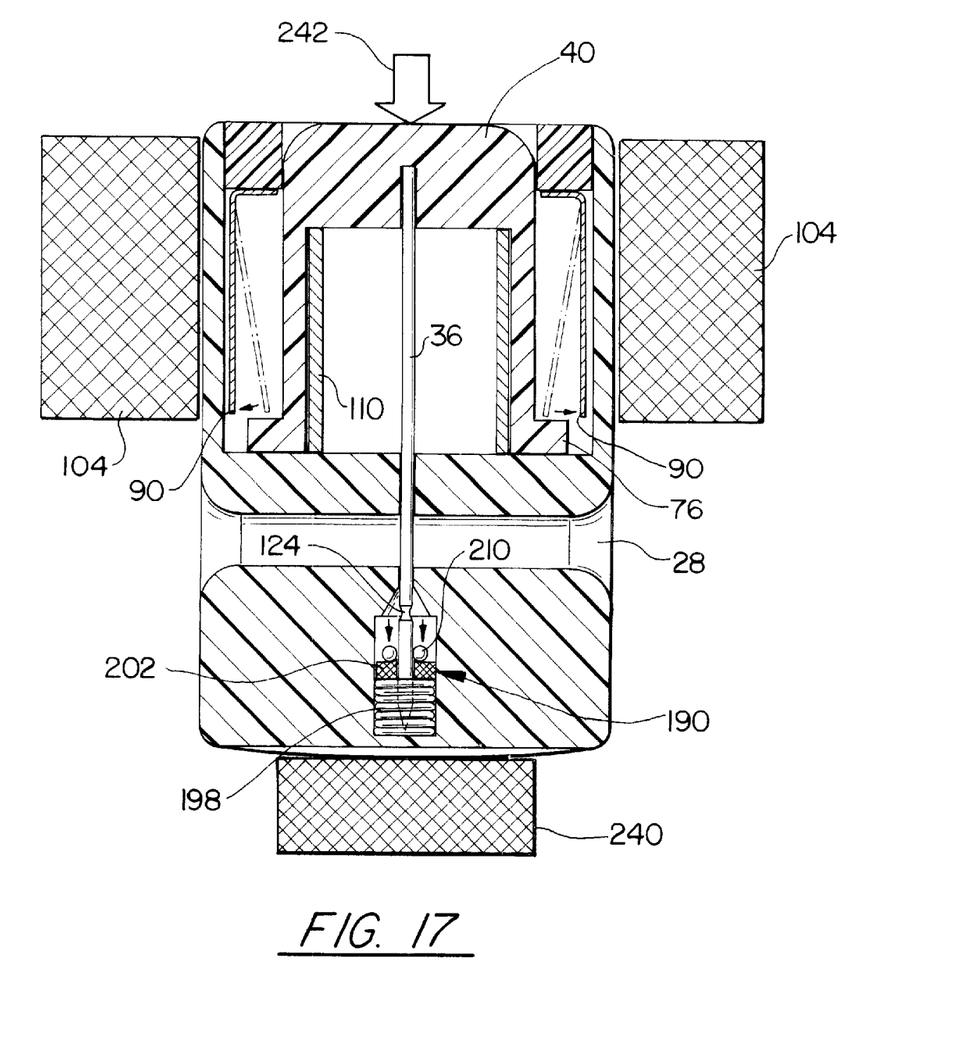
FIG. 17 is a schematic representation, partially in cross section and partially in phantom, of the operation of the detachment device.

The positioning of the magnets 104 substantially adjacent to the leaf springs 90 will act to draw the leaf springs 90 outward to release the head 40, as shown in FIG. 17. As indicated by the arrow 242 in FIG. 17, downward pressure on the head 40 is usually necessary to move the head 40 and tabs 76 from engagement with the leaf springs 90, so as to permit the leaf springs 90 to move outward under the attraction of the magnets 104. The magnet 240 will draw the collar 202 downward, to cause the clutch assembly 190 to release the pin 36. This will allow the pin 36 to move to the retracted position, and the tag 10 can then be removed from the article. The need to have at least three strong magnets properly positioned around the security tag in order to detach the security tag makes this tag very difficult to defeat without the detachment device.

This invention can be embodied in other specific forms without departing from the spirit or essential attributes thereof, and accordingly, reference should be had to the following claims, rather than to the foregoing specification, as indicating the scope of the invention.

What is claimed is:

1. A theft deterrent device, comprising:

a body portion;

an attachment portion, said attachment portion comprising an upper jaw and a lower jaw, said upper jaw being spaced from said lower jaw so as to define a mouth into which a portion of an article can be inserted;

a pin movably mounted in said upper jaw at least between a retracted position in which said pin does not substantially extend into said mouth, and an extended position in which said pin extends through said mouth and into said lower jaw;

releasable locking structure for locking said pin in said extended position;

said pin comprising a point at one end thereof, the end opposite said point being secured to a head, the head being movably mounted in a chamber in said upper jaw, whereby moving said head in said chamber moves said pin to the extended position;

a foot movably mounted in an aperture in said base of said chamber, said foot having a channel for receiving said pin;

biasing structure provided in said chamber and acting between said head and a base of said chamber for returning said head and said pin to the retracted position;

biasing structure mounted between said head and said foot so as to bias said foot into engagement with said article when said head is moved to said extended position, and;

biasing structure mounted between said foot and said base of said chamber so as to retract said foot into said chamber.

2. The theft deterrent device of claim 1, wherein said releasable locking structure comprises magnetically releasable structure.

3. The theft deterrent device of claim 2, wherein said magnetically releasable locking structure comprises at least one spring catch, said spring catch having a first position in which said spring catch locks said pin in said extended position, said spring catch being movable by the positioning of at least one magnet substantially adjacent to said spring catch to a second position in which said spring catch permits said pin to return to said retracted position.

4. The theft deterrent device of claim 3, wherein said magnetically releasable structure comprises at least two spring catches, such that at least two magnets, one positioned substantially adjacent to each spring catch, are necessary to permit said pin to return to said retracted position.

5. The theft deterrent device of claim 4, wherein said at least two spring catches are provided in said chamber, said head having locking tabs for engaging said spring catches, whereby said spring catches must be acted upon by magnets to move said spring catches out of locking engagement with said locking tabs.

6. The theft deterrent device of claim 1, wherein the releasable locking structure is a clutch.

7. The theft deterrent device of claim 1, wherein the pin has a shaft diameter less than about 0.030 inches.

8. The theft deterrent device of claim 1, wherein the pin has a shaft diameter less than about 0.025 inches.

9. The theft deterrent device of claim 1, wherein said biasing structure between said head and said base, between said foot and said base, and between said head and said foot, comprise substantially concentric springs.

10. The theft deterrent device of claim 9, wherein said biasing structures are substantially tubular springs.

* * * * *